United States Patent [19]

Poffenroth

[11] 4,227,649
[45] Oct. 14, 1980

[54] SPRAY MARKING ASSEMBLY

[76] Inventor: Alfred E. Poffenroth, General Delivery, Delacour, Alberta, Canada, T0M 0T0

[21] Appl. No.: 940,395

[22] Filed: Sep. 7, 1978

[30] Foreign Application Priority Data

Sep. 28, 1977 [CA] Canada .................................. 287677

[51] Int. Cl.³ ............................................. B05B 13/00
[52] U.S. Cl. .................................... 239/124; 239/163; 239/164; 239/170; 239/172; 239/176; 248/75
[58] Field of Search ................. 239/70, 124, 127, 146, 239/150, 159, 163–165, 169, 170, 172, 175, 176; 222/611; 248/75, 74 B, 72, 70

[56] References Cited

U.S. PATENT DOCUMENTS

| | | | |
|---|---|---|---|
| 2,800,365 | 7/1957 | Hodges | 239/127 X |
| 2,896,862 | 7/1959 | Bede | 239/124 X |
| 3,825,185 | 7/1974 | Moon et al. | 239/150 |

FOREIGN PATENT DOCUMENTS 911813 10/1972 Canada ....................................... 239/163

*Primary Examiner*—Andres Kashnikow
*Attorney, Agent, or Firm*—Stanley G. Ade

[57] ABSTRACT

The spray marking assembly is mounted on an agricultural or horticultural spraying or spreading implement to show visually, the area traversed so that the overlap or skip may be avoided. Usually, a pump sprays a dye from a tank through hoses to the extremity of the spray boom. This often causes poor markings due to scatter and loss as the pump has to move the fluid through the relatively long lines when demanded and the fluid and/or pressure tends to leak from the lines when not marking. The present device uses a motor and pump which run all the time when in use thus maintaining a constant pressure of fluid in the lines. A solenoid valve is situated at the extremity of the lines adjacent the discharge nozzle so that as soon as the valve is opened, the fluid under pressure is available at the nozzle. An accumulator is also provided adjacent the solenoid valve to give the necessary storage of extra fluid for dispersal through the discharge nozzle and to maintain the necessary pressure during opening of the discharge nozzle. A solid state timer in the cab of the tractor permits the operator to select the duration of spraying of the marking fluid, and the frequency of marking. An over-ride control enables the operator to mark manually on corners, knolls, and the like independently of the automatic actuation of the solenoid valve.

6 Claims, 3 Drawing Figures

SPRAY MARKING ASSEMBLY

BACKGROUND OF THE INVENTION

This invention relates to new and useful improvements in spray marking devices particularly adapted for use in conjunction with agricultural or horticultural spraying equipment, for the purpose of visually showing where the implement has traversed.

This is required in order to avoid firstly, an overlap of the spraying fluids and secondly, a missed area of spraying fluids.

There has been an increasing demand for effective yet inexpensive marking devices for indicating visually, the width traversed by agricultural or horticultural spraying and spreading implements which may apply liquid and granular herbicides, insecticides and fertilizers.

It has become extremely important for the operator to be able to determine accurately the area covered by the previous pass of the machine so as not to overlap in an application or to miss areas. With today's spray concentrates, overlaps may cause some crop damage and misses lead to considerable financial waste inasmuch as weeds, insects and the like are not controlled.

The mechanical methods used in the past have caused considerable crop damage and have often been limited in application. Some of the present devices have not proven to be terribly effective as the marks have not been as visible as required under certain conditions or they have not had the lasting effects required in many cases. Some devices and marking methods have experienced many mechanical problems and have proven to be quite expensive and there has also been a great need for a device which is adaptable to all spraying and spreading implements.

One of the principal disadvantages of current implements is the fact that the pump and control valve are normally situated adjacent the center of the implement with the lines leading to a discharge nozzle at the end of the boom which may be some 30 to 40 feet away from the control valve. This means that the pressure has to be built up in the relatively long lines before discharge can occur so that the marking liquid is often dispersed or scattered through drift.

Another disadvantage is that when not in use, pressure and/or marking liquid often leaks away in the lines between the valve and the discharge nozzle.

SUMMARY OF THE INVENTION

The present invention overcomes these disadvantages by providing the solenoid control valve adjacent the discharge nozzle and one aspect of the invention consists of a field spray marker for use with an agricultural or horticultural sprayer which includes a source of electrical power, an outwardly extending boom on each side carrying spray nozzles and a tank containing spraying fluid and the like. It comprises in combination a tank for carrying a marking fluid for spraying visual indicating marks on vegetation and/or ground surfaces, a normally closed solenoid valve situated adjacent the outer end of at least one of said extending booms, a marker discharge nozzle adjacent said solenoid valve and being operatively connected thereto, a pump and motor assembly operatively connected to said tank carrying marking fluid, conduit means operatively connecting said pump and motor to said solenoid valve and means to operate said solenoid valve from the closed to the open position and vice-versa.

Another aspect of the invention is to provide a pump and motor assembly which is running constantly while the spray marker is in operation thus maintaining a pressure head at the solenoid valve immediately adjacent the discharge nozzle.

Another aspect of the invention may provide an accumulator adjacent the solenoid valve to give the additional volume of liquid required for spraying the marks and to prevent immediate pressure drop when the solenoid valve is opened.

Another apsect of the invention is to provide an electronic control adjacent the operator so that he may adjust the length of the marks, and the distance between adjacent marks. An over-ride may be provided so that he can cause additional marks to be placed if and when necessary.

Another aspect of the invention is to provide a device of the character herewithin described which is simple in construction, economical in manufacture and which can be readily fitted to a variety of spraying and spreading machines.

With the foregoing in view, and other advantages as will become apparent to those skilled in the arts to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 4 is a fragmentary end view of the tank similar to that of FIG. 2 but showing an alternative location for, and operation of, the accumulator.

In the drawings like characters of reference indicate corresponding parts in the different figures.

DETAILED DESCRIPTION

Figure 1:
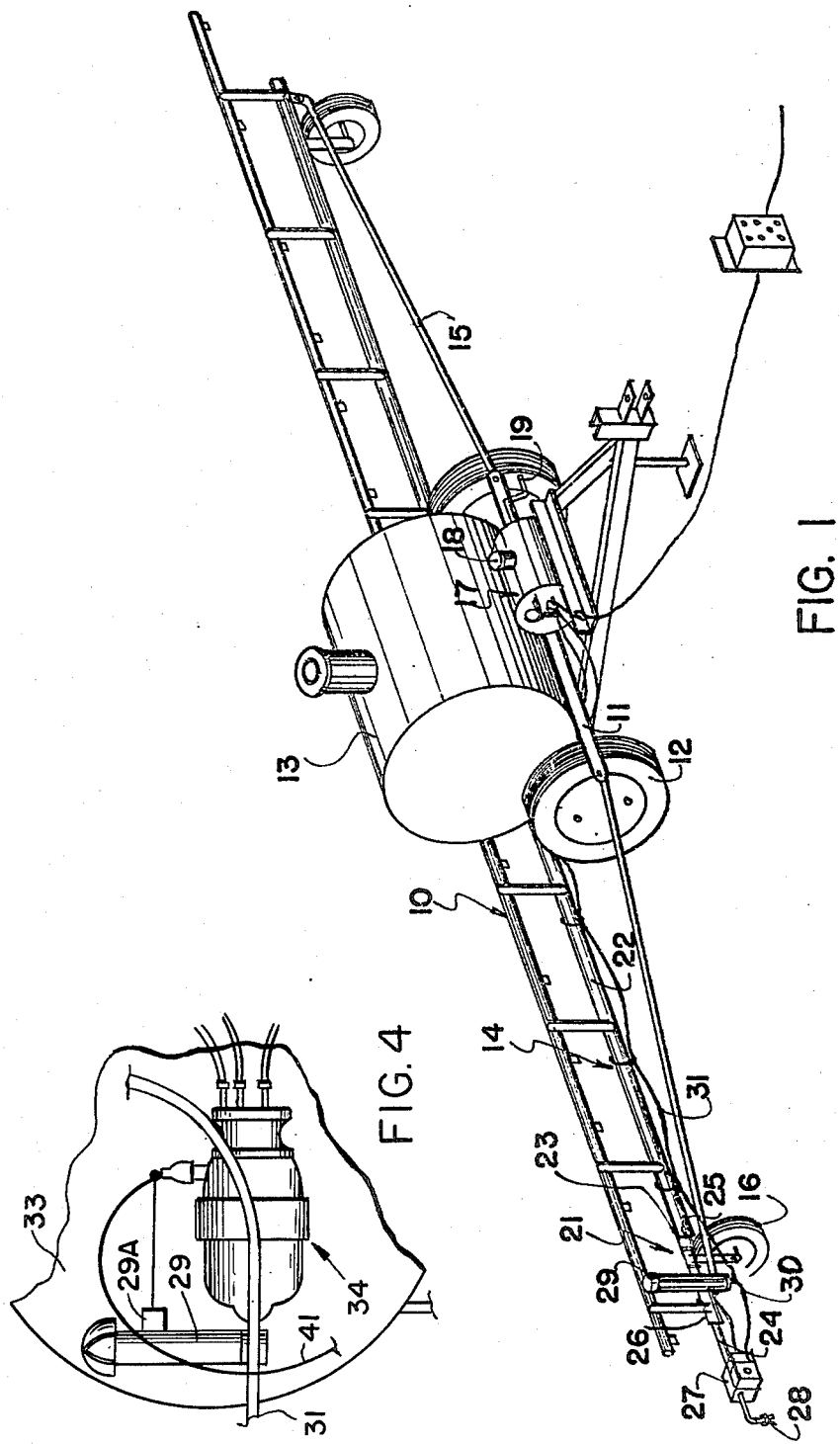
FIG. 1 is a front partially schematic view of a conventional sprayer with the invention secured thereto.

Proceeding therefore to describe the invention in detail, reference character 10 illustrates a conventional sprayer although it will be appreciated that the invention can be attached to any conventional sprayer or spreading device used for agricultural or horticultural purposes.

This particular sprayer includes a chassis 11 mounted upon ground engaging wheels 12 and carrying the main spray containing tank 13. Outwardly extending spray boom assemblies 14 are situated upon either side of the chassis and supported by means of braces 15 and castoring wheels 16 support the outer ends of these boom assemblies in the usual way.

Figure 3:
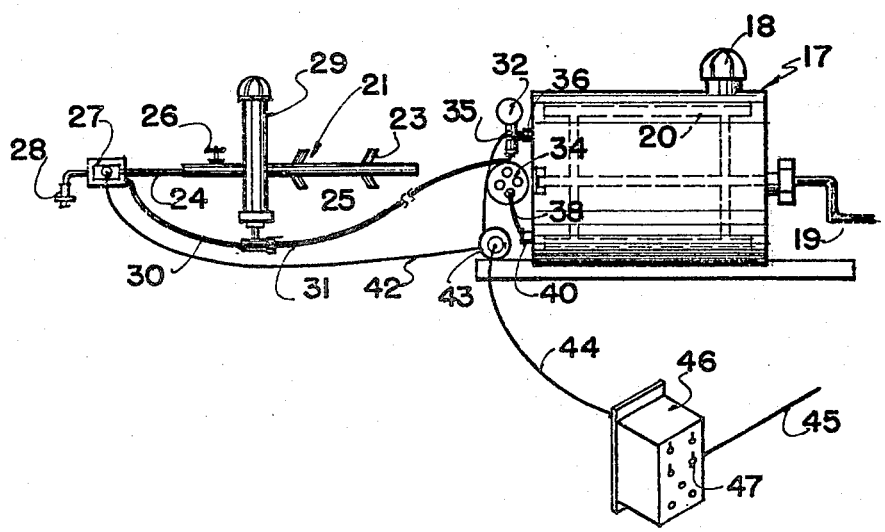
FIG. 3 is a partially schematic view of the completed unit detached from the conventional sprayer of FIG. 1.

The present invention includes a marking fluid reservoir collectively designated 17 mounted upon the chassis 11 forwardly of the main tank 13. This reservoir 17 includes a filler cap 18 and a hand crank assembly 19 operatively connected to mixing blades 20 (see FIG. 3) within the tank so that the marking fluid (not illustrated) can be stirred manually if desired in order to mix the marking fluid materials.

A bracket assembly 21 is adjustably securable to adjacent the outer end of the main member 22 of the boom assembly 14 by means of straps 23 engaging around the support 22 and being clamped thereto by conventional means such as nuts and bolts (not illustrated). This bracket assembly includes a telescopic rod 24 which slides within a tube 25 forming part of the bracket assembly and being clamped in the desired position by means of a clamp bolt 26 extending through the wall of the tube and engaging the rod 24 in the usual way.

A conventional solenoid valve 27 is secured to adjacent the distal end of rod 24 and a discharge nozzle assembly 28 is secured to the solenoid valve and normally extends downwardly so that it may spray marking fluid upon the ground surface or foliage being traversed by the sprayer 10.

This rod assembly can be rotated fore and aft within limits so that the spray can be directed slightly forwardly upon foliage thus making it extremely visible to the operator on the next pass around the field being sprayed.

A conventional accumulator 29 is also mounted upon the bracket assembly 21 and contains marking fluid and compressed air in the usual way. This accumulator serves two purposes. Firstly, for preventing an immediate drop of pressure when the solenoid valve is opened due to the compressed air cushion within the accumulator and secondly, to provide a volume of fluid for the discharge nozzle 28 when the solenoid valve is opened thus ensuring sufficient marking fluid is available for the discharge nozzle. Alternatively, the accumulator may be mounted adjacent to the tank 17 as shown in FIG. 4.

Figure 2:
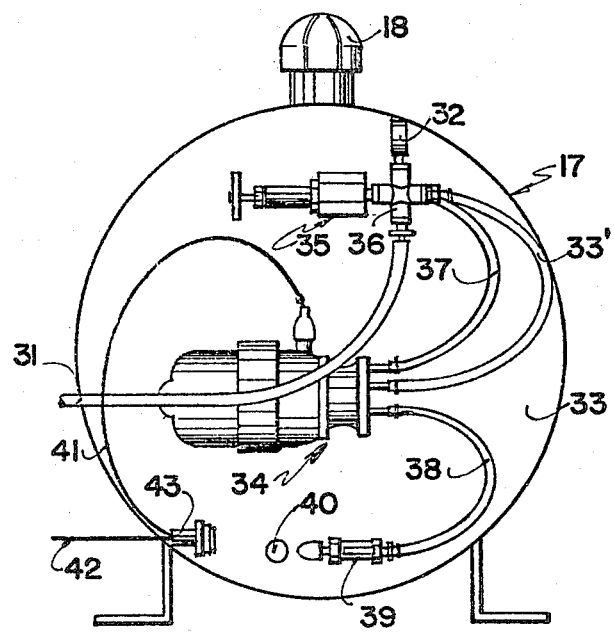
FIG. 2 is an end view of the marking fluid tank with various components secured thereto.

A conduit 30 extends between the accumulator and the solenoid valve 27 and a further conduit 31 extends to the accumulator from a pressure gauge 32 situated on one end 33 of the tank 17 (see FIG. 2).

This pressure gauge 32 is connected by a flexible conduit 33' to a motor and pump assembly collectively designated 34 and an adjustable relief valve assembly 35 is connected to the multi-connection union 36 to which the pressure gauge is also attached. A return hose or conduit 37 extends from this connector to the pump and a supply hose or conduit 38 extends from the pump to a quick connect ball valve shut-off and strainer screen assembly 39 which in turn may be detachably connected to a corresponding component 40 within the tank 17.

An electrical cable 41 extends from a source of electrical power (not illustrated) to the motor portion of the pump and motor component 34 so that when it is in operation, the pump and motor operates constantly and maintains a predetermined pressure within the hose or conduit 31 as registered on the pressure gauge 32 and controlled by the adjustable relief valve 35 and, of course, it will be appreciated that this constant pressure is available at the accumulator 29 and at the solenoid valve 27. Alternatively, the pump and motor component may be operatively connected to the accumulator and controlled by a pressure switch 29A which maintains a constant pressure within the accumulator and controls the operation of the pump and motor component.

A further electrical cable 42 extends from a connector terminal assembly 43, to the solenoid valve 27 for operation of the normally closed solenoid valve and both this cable 42 and the aforementioned cable 41 connect to the connector 43 so that a simple plug (not illustrated) may be connected to this assembly 43 and extend to the towing vehicle such as a tractor (not illustrated) to supply electrical energy to the assembly.

This last-mentioned electrical cable 44 is preferably operated by 12 volts D.C., as indicated by 45 and also extends to an electronic timer assembly 46. This timer assembly which is conventional in operation, is preferably solid state and is adapted to provide means to supply constant power to the pump and motor assembly 34 and intermittent power to the solenoid valve 27.

Means 47 on the timer enable the operator to control the length of time the solenoid valve is opened and hence the length of the mark made by the spray nozzle 28 and similar means are provided to enable the operator to control the length of time that the solenoid valve is closed and hence to contro the spacing between adjacent marks made by the discharge spray nozzle 28.

Furthermore, a main on/off switch is provided together with an over-ride switch enabling the operator to open and close the solenoid valve as desired in order that additional marks may be made to indicate, for example, corners in the field, knolls and the like.

In operation, the operator selects the length of the mark to be made and the spacing between marks and fills tank 17 with the marking fluid. The agitator crank 19 may be turned initially to ensure correct mixing of the marking fluid, but during operation, the constant circulation of this fluid via the pressure relief valve and the return hose 37, normally supplies sufficient agitation to the fluid.

As the spraying progresses, the solenoid valve 27 is opened and closed as controlled by the electronic timer 46 so that spray indicating marks are made on the ground surface and/or vegetation thus enabling the operator accurately to spray the field without overlap of the spray pattern or missed areas.

The constant running of the pump motor assembly 34 maintains a constant pressure within conduits 31 and 30 and the accumulator 29 and the solenoid valve 27 with the accumulator maintaining the necessary pressure during discharge of the marking fluid and supplying sufficient volume of fluid for this purpose.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A field spray marker for use with an agricultural or horticultural sprayer which includes a source of electrical power, an outwardly extending boom on each side carrying spray nozzles, and a tank containing spray fluid and the like; comprising in combination a tank for carrying marking fluid for spraying visual indicating marks on vegetation and/or ground surfaces, a normally closed solenoid valve situated adjacent the outer end of at least one of said extending booms, a marker discharge nozzle adjacent said solenoid valve and being operatively connected thereto, a pump and motor assembly operatively connected to said tank carrying marking fluid, conduit means operatively connecting said pump and motor to said solenoid valve and means to operate said solenoid valve from the closed to the open position and vice-versa, said pump and motor being constantly operating when said marker is in use thereby maintaining a constant fluid pressure at solenoid valve, an adjustable relief valve operatively connected between said pump and said tank, and means to mount said solenoid valve and said discharge nozzle upon said extending boom, said last mentioned means including a bracket assembly securable to said boom, said solenoid valve and said discharge nozzle being supported upon said bracket assembly, said bracket assembly including an extendable and retractable arm on said bracket, said discharge nozzle and said solenoid valve being supported upon said arm, and means to adjust said arm within limits in an inwardly and outwardly direction relative to said bracket assembly, to position said discharge nozzle relative to said outer end of said boom.

2. The invention according to claim 1 which includes an accumulator situated adjacent said solenoid valve operatively connected to said conduit means and to said solenoid valve.

3. The invention according to claim 1 in which said means to operate said solenoid valve includes an electronic control means remote from said solenoid valve and being operatively connected thereto, said control means including first adjustable means to vary the length of time said solenoid is open, thereby controlling the length of the marks made by said discharge nozzle, second adjustable means to vary the length of time said solenoid valve is closed thereby controlling space in between said marks, and over-ride means whereby said operator can open and close said solenoid valve independently of said first and second means.

4. The invention according to claim 2 in which said means to operate said solenoid valve includes an electronic control means remote from said solenoid valve and being operatively connected thereto, said control means including first adjustable means to vary the length of time said solenoid is open, thereby controlling the length of the marks made by said discharge nozzle, second adjustable means to vary the length of time said solenoid valve is closed thereby controlling space in between said marks, and over-ride means whereby said operator can open and close said solenoid valve independently of said first and second means.

5. The invention according to claims 1, 2 or 3 in which at least said arm is adjustably rotational within limits to control the direction of the marking fluid discharging through said discharge nozzle, fore and aft relative to the longitudinal axis of said boom.

6. The invention according to claim 4 in which at least said arm is adjustable rotational within limits to control the direction of the marking fluid discharging through said discharge nozzle, fore and aft relative to the longitudinal axis of said boom.

* * * * *